(12) United States Patent
Shah et al.

(10) Patent No.: US 7,408,327 B2
(45) Date of Patent: *Aug. 5, 2008

(54) BUCK/BOOST METHOD OF VOLTAGE REGULATION FOR A PERMANENT MAGNET GENERATOR (PMG)

(75) Inventors: Mahesh J. Shah, Lindenhurst, IL (US); George H. Seffernick, Wapakoneta, OH (US)

(73) Assignee: Hamilton Sunstrand Corporation, Rockford, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/788,953

(22) Filed: Apr. 23, 2007

(65) Prior Publication Data

US 2007/0194762 A1    Aug. 23, 2007

Related U.S. Application Data

(62) Division of application No. 11/185,422, filed on Jul. 20, 2005, now Pat. No. 7,224,147.

(51) Int. Cl.
*H02P 9/14* (2006.01)
*H02P 9/10* (2006.01)

(52) U.S. Cl. .......................................... 322/46; 322/59

(58) Field of Classification Search ................ 322/59, 322/46, 44, 25; 310/191
See application file for complete search history.

(56) References Cited

U.S. PATENT DOCUMENTS

| | | | |
|---|---|---|---|
| 3,014,170 A | 12/1961 | Nygard | |
| 4,486,678 A | 12/1984 | Olson | |
| 4,540,930 A * | 9/1985 | Siedband | 322/4 |
| 4,663,581 A | 5/1987 | Glennon | |
| 5,325,007 A | 6/1994 | Huss et al. | |
| 5,349,257 A | 9/1994 | Hernden | |
| 5,473,227 A | 12/1995 | Arnaud et al. | |
| 5,602,462 A * | 2/1997 | Stich et al. | 323/258 |
| 5,656,922 A * | 8/1997 | LaVelle et al. | 322/46 |
| 5,886,442 A * | 3/1999 | Ogino et al. | 310/181 |
| 5,955,809 A | 9/1999 | Shah | |
| 6,115,267 A * | 9/2000 | Herbert | 363/25 |
| 6,310,901 B1 | 10/2001 | Mahmoudi et al. | |
| 6,611,438 B2 | 8/2003 | Kawazoe et al. | |
| 6,787,933 B2 * | 9/2004 | Claude et al. | 290/52 |
| 6,813,167 B2 | 11/2004 | Nakamura et al. | |
| 7,081,732 B2 | 7/2006 | Han et al. | |
| 7,187,371 B2 * | 3/2007 | Kang | 345/204 |
| 2003/0015873 A1 * | 1/2003 | Khalizadeh et al. | 290/7 |
| 2004/0027737 A1 | 2/2004 | Xu et al. | |
| 2006/0284505 A1 | 12/2006 | Han et al. | |

\* cited by examiner

*Primary Examiner*—Julio C. Gonzalez
(74) *Attorney, Agent, or Firm*—Kinney & Lange, PA

(57) ABSTRACT

The output voltage generated by permanent magnet generator (PMG) is regulated by controlling a buck/boost voltage applied to selected sub-coils within the PMG. The PMG includes a number of stator coils that are each divided into a number of sub-coils. A buck/boost voltage source generates a buck/boost voltage, and a controller connected to monitor the output voltage generated by the PMG selectively applies the buck/boost voltage to selected sub-coils based on the monitored output voltage. In this way, the controller is able to regulate the output voltage by selectively controlling the buck/boost voltage applied to the selected sub-coils.

12 Claims, 6 Drawing Sheets

BUCK/BOOST METHOD OF VOLTAGE REGULATION FOR A PERMANENT MAGNET GENERATOR (PMG)

CROSS-REFERENCE TO RELATED APPLICATION(S)

This application is a division of U.S. application Ser. No. 11/185,422 entitled "BUCK/BOOST METHOD OF VOLTAGE REGULATION FOR A PERMANENT MAGNET GENERATOR (PMG)," now U.S. Pat. No. 7,224,147, filed on Jul. 20, 2005.

BACKGROUND OF INVENTION

A permanent magnet generator (PMG) is used to convert mechanical energy, usually rotational, to electrical energy. The typical PMG receives mechanical energy from a prime mover. The prime mover may be, for example, a gas turbine engine of an aircraft. The prime mover causes a rotor located within the PMG to spin. Magnetic flux created by permanent magnets located on the rotor cause an emf voltage to be generated in stator windings. The accumulation of the voltage generated at each of these coils is provided as an output voltage to a load.

The output voltage generated by the PMG is dependent, in part, on the speed of the prime mover as well as the overall impedance of the load. That is, a decrease in rotational velocity of the prime mover results in a decreased rotational velocity of the rotor, and a resulting decrease in the output voltage generated by the stator windings. An increase in rotation of the prime mover results in an increase of the output voltage generated by the coils in the stator. Likewise, a decrease in the impedance of the load results in an increase in the output voltage of the PMG, and an increase in the impedance of the load results in a decrease in the output voltage of the PMG.

In many applications, variations in the output voltage of the PMG are not acceptable. However, it is not always possible to precisely control the speed of the prime mover or the impedance of the load. In these applications, it would be desirable to be able to maintain the output voltage of the PMG despite variations in speed of the prime mover or impedance of the load. In other applications, it is desirable to be able to control the output voltage of the PMG without having to modify the speed of the prime mover or the impedance of the load.

BRIEF SUMMARY OF INVENTION

In one aspect, the present invention is a permanent magnet generator (PMG) system for regulating an output voltage. The system includes a PMG having a rotor connectable to a prime mover, a stator having stator teeth, and stator coils wrapped around the stator teeth and divided into sub-coils. A buck/boost voltage is connected to selected sub-coils, wherein applying the buck/boost voltage to the selected sub-coils increases or decreases the output voltage. A controller monitors the output voltage and selectively applies the buck/boost voltage to the sub-coils based on the monitored output voltage.

DETAILED DESCRIPTION

Figure 1:
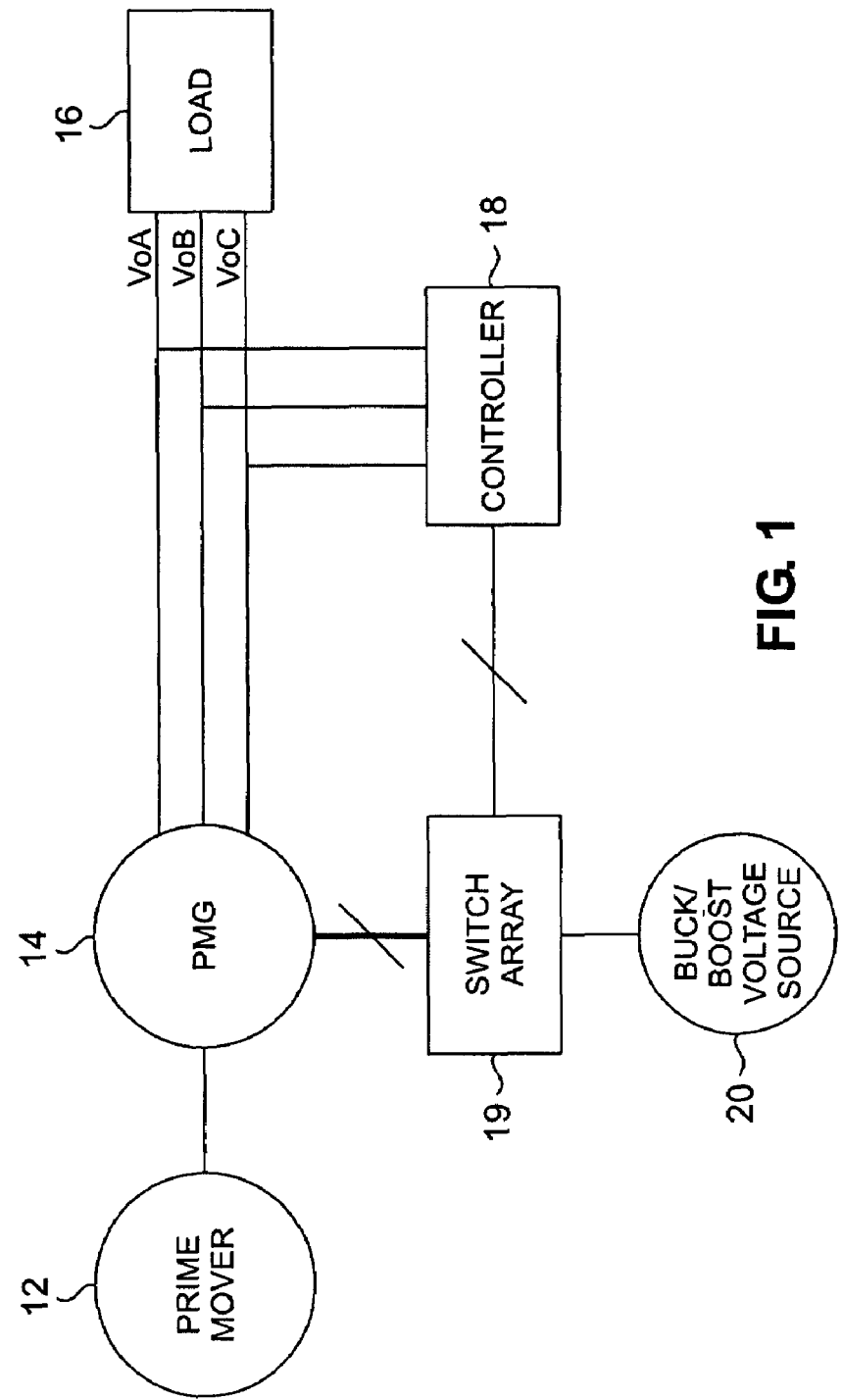
FIG. 1 is a functional block diagram of a permanent magnet generator system of the present invention for maintaining a constant output voltage.

FIG. 1 shows an embodiment of permanent magnet generator voltage regulation system 10 of the present invention, including prime mover 12, permanent magnet generator (PMG) 14, three-phase output voltage VoA, VoB, and VoC, load 16, controller 18, switch array 19, and buck/boost voltage source 20. Prime mover 12 is connected to PMG 14, supplying PMG 14 with rotational, mechanical energy. PMG 14 converts mechanical energy supplied by prime mover 12 to electrical energy, which is supplied to load 16 and is illustrated as three-phase output voltage VoA, VoB, and VoC (collectively "output voltage Vo").

There are two variables external to PMG 14 that affect output voltage Vo. The first is the rotational velocity of prime mover 12. If prime mover 12 rotates faster, then output voltage Vo will increase. If prime mover 12 rotates slower, then output voltage Vo will decrease. The second variable that affects output voltage Vo is the impedance of load 16. If the impedance of load 16 increases, output voltage Vo provided by PMG 14 will decrease. If the impedance of load 16 decreases, output voltage 16 provided by PMG 14 will increase. In a number of applications, rotational velocity of the prime mover and impedance of the load are not easily controlled. The present invention provides a system and method of maintaining a relatively constant output voltage Vo despite variations in rotational velocity of prime mover 12 and impedance of load 16.

To maintain a constant output voltage Vo, controller 18 monitors output voltage Vo. If a change in output voltage Vo is detected, controller 18 selectively operates a number of switches (shown in FIGS. 3, 5, and 7) located in switch array 19 to configure stator coils (shown in FIGS. 2-7) to effectively regulate output voltage Vo. Each of the stator coils is divided into two or more sub-coils. Depending on the output voltage Vo detected, controller 18 controls switches in switch array 19 to connect the sub-coils in one of many possible configurations to generate the desired output voltage. Controller 18 is also responsible for controlling when and how buck/boost voltage Vbb is applied to the sub-coils of PMG 14. Buck/boost voltage Vbb, when applied to the sub-coils, can be used as the name suggests to either buck (decrease) or boost (increase) output voltage Vo.

There are several ways to generate buck/boost voltage Vbb. In each of these embodiments, buck/boost voltage is maintained at the same frequency as output voltage Vo. The reasons for this are discussed in more detail below, but without consistent frequency between buck/boost voltage and output voltage Vo, constant voltage regulation cannot be maintained. Depending on the operation (bucking or boosting) the buck/ boost voltage is maintained in phase with output voltage Vo (boosting) or 180 degrees out of phase with output voltage Vo (bucking). In one embodiment, a portion of output voltage Vo is feed back through controller 19 and switch array 20 to the sub-coils of PMG 14. This arrangement ensures that frequency of buck/boost voltage Vbb and output voltage Vo are equal. In another embodiment, a second set of stator coils (not shown), in addition to the set of stator coils located within PMG 14 (shown in FIG. 2), is used to generate voltage from the mechanical energy provided by prime mover 12. As prime mover 12 rotates, stator coils within PMG 14 as well as the second set of stator coils generates voltage. Because the frequency of prime mover 12 is the same for both the set of stators located within PMG 14 and the second set of stators, the frequency of the voltage generated by PMG 14 and the second set of stator coils is equal. In both of these embodiments, buck/boost voltage Vbb is generated in phase with output voltage Vo. By switching the input leads connecting buck/boost voltage Vbb to selected sub-coils, the phase of buck/boost voltage can be changed by 180 degrees. Thus, during a boosting operation, buck/boost voltage Vbb generated by one of the methods described above is delivered to the selected sub-coils in phase with output voltage Vo. During a bucking operation, buck/boost voltage Vbb generated by one of the methods described above is delivered to the selected sub-coils 180 degrees out of phase with output voltage Vo.

Figure 2:
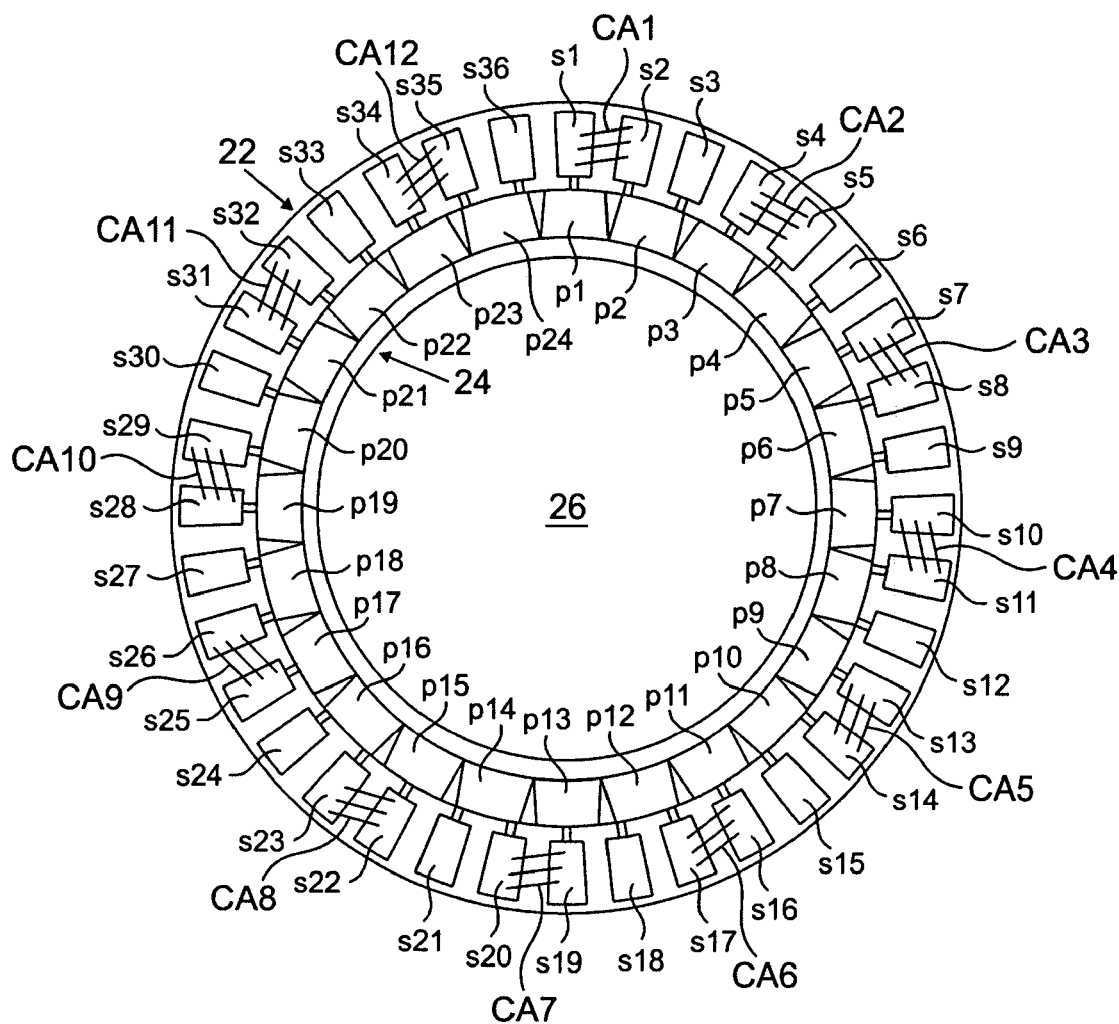
FIG. 2 is a cross sectional view illustrating the geometry of a permanent magnet generator of the present invention.

FIG. 2 shows an embodiment of permanent magnet generator 14 of the present invention, including stator 22, rotor 24, and axis 26 connecting rotor 24 to prime mover 12 (shown in FIG. 1). Rotor 24 includes a plurality of poles P1-P24, making this a twenty-four pole rotor. Stator 22 includes a plurality of stator slots S1-S36, making this a thirty-six slot stator. Each adjacent set of slots, for instance slots S1 and S2, form a stator tooth upon which a coil or winding is wrapped (in this case, coil CA1). Because the output of PMG 14 is three phase power, there are three electrically separate sets of coils.

For ease of illustration, FIG. 2 shows only the set of coils CA1-CA12 responsible for output voltage VoA (shown in FIG. 1 as one of the three phases of power). Coil CA1 is wrapped around the stator tooth located between stator slots S1 and S2. Coil CA2 is wrapped around the stator tooth located between stator slots S4 and S5. Coil CA3 is wrapped around the stator tooth located between stator slots S7 and S8, and so on. In order to maximize the efficiency, coils CA1-CA12 are spaced equally around stator 22. The equal spacing of coils CA1-CA12 and a slot/pole/phase ratio of 0.5 (36 slots/24 poles/3 phases) results in each coil CA1-CA12 being exposed to equal magnitude and direction of magnetic flux generated by poles P1-P24 such that output voltage VoA is maximized. Two other sets of coils (not shown) are wound in similar fashion around the remaining stator teeth located between slots S1-S36 to create the other two phases of power, VoB and VoC. As shown in FIGS. 3-7 and discussed above, each coil CA1-CA12 (as well as the coils used for generated output voltage VoB and VoC) is divided into sub-coils, which may be connected in a number of configurations to either increase or decrease output voltage Vo.

Rotation provided by prime mover 12 is transferred to rotor 24 via axis 26. Thus, prime mover 12 causes rotor 24, and magnetic poles P1-P24 located on rotor 24, to spin. Voltage in the number of coils CA1-CA12 is created by the rotation of magnetic poles P1-P24, and the resulting magnetic flux seen by coils CA1-CA12. Each adjacent pole is necessarily of a different polarity. For instance, if magnetic pole P2 is a magnetic north pole, then both magnetic poles P1 and P3 are magnetic south poles. Magnetic flux generated by adjacent poles travels in part through the number of coils C1A-C12A (as well as those coils not shown) within stator 22. As rotor 24 spins, magnetic flux through coils CA1-CA12 varies, resulting in emf voltage being generated in each of the number of coils CA1-CA12. As shown in FIGS. 3-7, coils CA1-CA12 are each divided into sub-coils. Depending on the connection of the various sub-coils, output voltage VoA can be regulated as desired. Output voltage Vo generated by the number of coils is described in the following equation, assuming the output voltage is not connected to a load.

$$Vo = 4.44 * (Frequency) * (\#ofTurns) * (MagneticFlux) * (Area * 10^{-8}) \qquad \text{EQ. 1}$$

Equation 1 illustrates the variables that affect output voltage Vo. Each of the variables is directly related to voltage, thus as frequency, number of turns, magnetic flux or area increase, so does output voltage 16. Likewise if any of these variables decrease, so does output voltage 16. Frequency is related to the speed at which prime mover 12 rotates, and area refers to the area cross section of each of the number of coils CA1-CA12. The frequency of the prime mover is external to PMG 14 and is not directly controlled in the present invention. Likewise, area is also kept constant in the present invention. This leaves number of turns and magnetic flux as the remaining variable that can affect of output voltage Vo.

Number of turns relates to the number of turns of wire making up each coil CA1-CA12. In one aspect of the present invention, controller 18 selectively modifies how the sub-coils are connected. This allows controller 18 to adjust the number of turns contributing to create output voltage Vo. Likewise, magnetic flux refers to the density of magnetic flux within each coil CA1-CA1 2. As shown in FIGS. 3-7, the present invention also selectively modifies the density of magnetic flux in each coil by selectively applying buck/boost voltage Vbb to the sub-coils in order to modify output voltage 16. FIGS. 3-7 illustrate a number of ways in which coils C1-C12, as well as their counterparts in the other two phases, can be connected to vary the output voltage generated.

Figure 3:
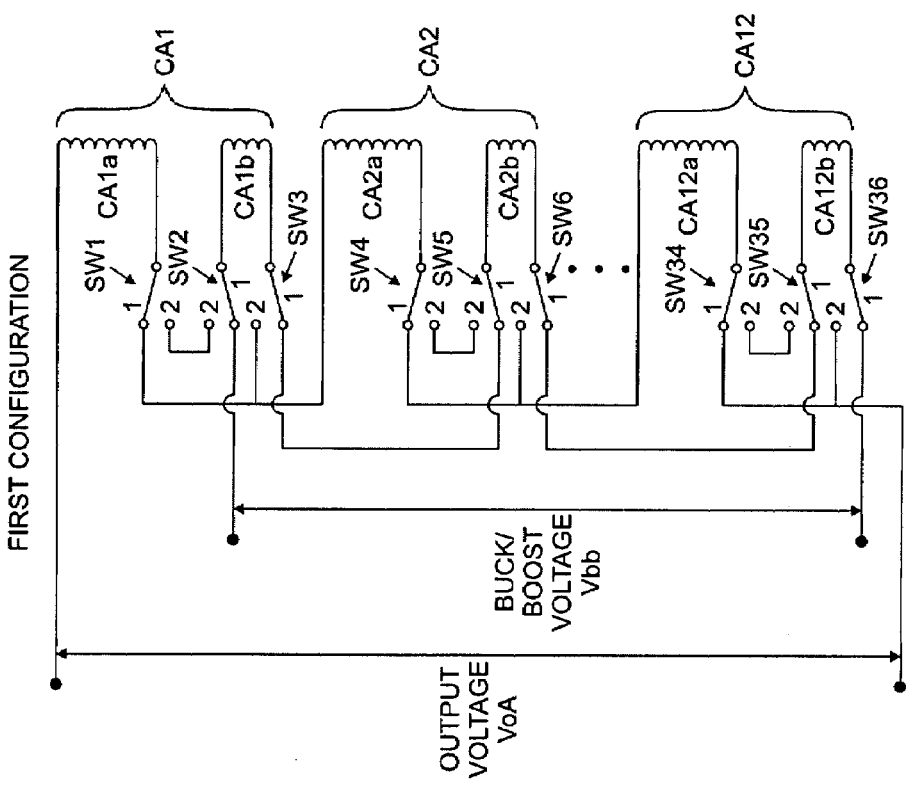
FIG. 3 is a circuit diagram illustrating stator coils of the PMG connected in a first configuration, in which the first sub-coils are connected in series and second sub-coils are connected in series.

FIG. 3 shows coils CA1-CA12, each coil divided into first sub-coils CA1a-CA12a and second sub-coils CA1b-CA12b. For instance, coil CA1 is divided into first sub-coil CA1a and second sub-coil CA1b, and coil CA2 is divided into first sub-coil CA2a and second sub-coil CA2b. To maintain equal voltage generation between each of the coils CA1-CA12 depending on the particular configuration selected, the number of turns of each of the plurality of first sub-coils CA1a-CA12a is equal, and the number of turns of each of the plurality of second sub-coils CA1b-CA12b is equal. For instance, in this embodiment, the ratio of turns between first sub-coils CA1a-CA12a and coils CA1-CA12 is 0.6:1. That is, coils CA1-CA12 are divided such that first sub-coils CA1a-CA12a contain 60% of the turns, and second sub-coils CA1b-CA12b contain the remaining 40% of the turns. For the sake of simplicity, this embodiment shows each coil divided into two sub-coils.

A plurality of switches SW1-SW36 (generally SW) allows first and second sub-coils to be connected in a number of configurations. In the exemplary embodiment shown in FIG. 3, switch SW1 is connected to first sub-coil CA1a, and switches SW2 and SW3 are connected to second sub-coil CA1b. Likewise, switch SW4 is connected to first sub-coil CA2a, and switches SW5 and SW6 are connected to second sub-coil CA2b. Each switch SW selects between one of two possible connections. The connections associated with each switch SW are labeled in FIG. 3 and FIG. 5 with a "1" or a "2". In the first configuration, shown in FIG. 3, switches SW are set to the first position labeled with a "1". In the second configuration, shown in FIG. 5, switches SW are set to the second position labeled with a "2". By setting switches SW to the first position, first sub-coils CA1a-CA12a are connected in series with one another. For example, first sub-coil CA1a is connected in series with first sub-coil CA2a via switch SW1. Likewise, if switches SW are in the first position, second sub-coils CA1b-CA12b are connected in series with one another. For example, second sub-coil CA1b is connected in series with second sub-coil CA2b via switch SW3 and switch SW5. A buck/boost voltage source Vbb is also connected to the series of second sub-coils CA1b-CA12b. As shown in FIG. 3, buck/boost voltage Vbb is connected to second sub-coil CA1b via switch SW2 and to second sub-coil CA12b via switch SW 36.

The output voltage generated when the plurality of switches SW are in the first position is dependent on the application of buck/boost voltage Vbb. The buck/boost voltage can be applied in three ways; no buck/boost voltage is applied (effect illustrated in FIG. 4A), buck/boost voltage applied such that magnetic flux generated in second sub-coils increases magnetic flux in first sub-coils (effect shown in FIG. 4B), and buck/boost voltage applied such that magnetic flux generated in second sub-coils decreases magnetic flux in first sub-coils (effect shown in FIG. 4C). Setting switches SW to the second position (shown in FIG. 5) connects first sub-coils CA1a-CA12a and second sub-coils CA1b-CA12b in series with one another, increasing the total number of turns being utilized to generate output voltage VoA, resulting in an increase of output voltage VoA per equation 1. Each of these configurations is discussed in more detail below.

Figure 4A:
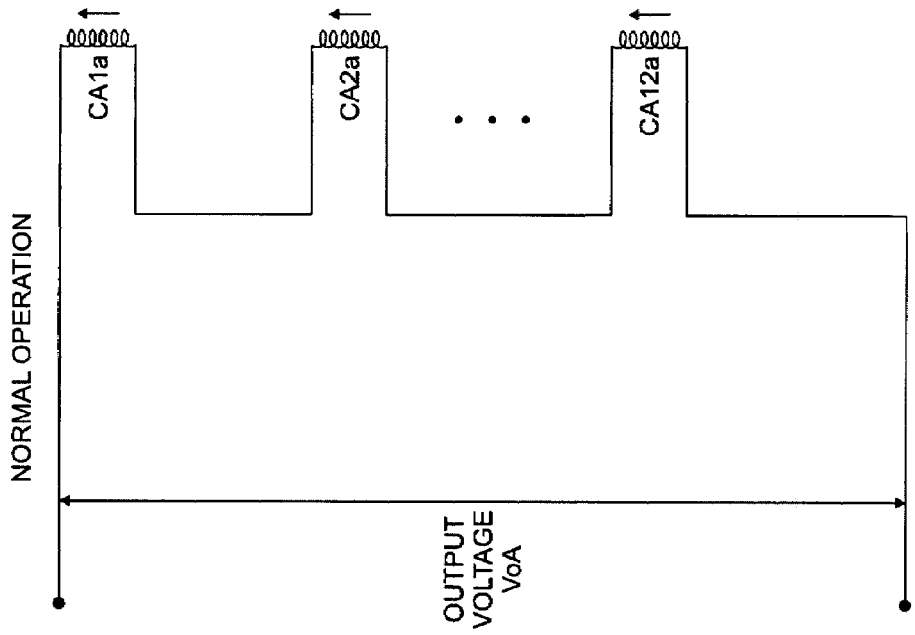
FIGS. 4A-4C are circuit diagrams illustrating the effect of applying either no voltage, a boosting voltage, or a bucking voltage to the second sub-coils of the PMG connected in the first configuration.

FIG. 4A shows the effect of applying no buck/boost voltage Vbb to the plurality of second sub-coils CA1b-CA12b. Because no buck/boost voltage Vbb is applied to the plurality of second sub-coils CA1b-CA12b connected in series with one another, no magnetic flux is generated in second sub-coils CA1b-CA12b. With no magnetic flux generated in second sub-coils CA1b-CA12b, they have no effect on the generation of output voltage created by first sub-coils CA1a-CA12a. Magnetic flux generated by the plurality of poles P1-P24 (shown in FIG. 2) crossing through first sub-coils CA1a-CA12a results in generation of voltage in each of the first sub-coils. Because each of the first sub-coils CA1a-CA12a is connected in series and the magnetic flux passing through each sub-coil is oriented in the same direction in each of the sub-coils, output voltage VoA generated is the combined total of the voltage generated at each of the first sub-coils CA1a-CA12a.

This configuration of sub-coils, along with the absence of any type of buck/boost voltage Vbb is labeled as normal operation. From this configuration, output voltage 16 can be regulated despite variations in either the speed of prime mover 12 (shown in FIG. 1) or in the impedance of load 16 (shown in FIG. 1). That is, output voltage Vo can be increased or decreased as necessary to offset increases or decreases caused by outside variables.

Figure 4C:
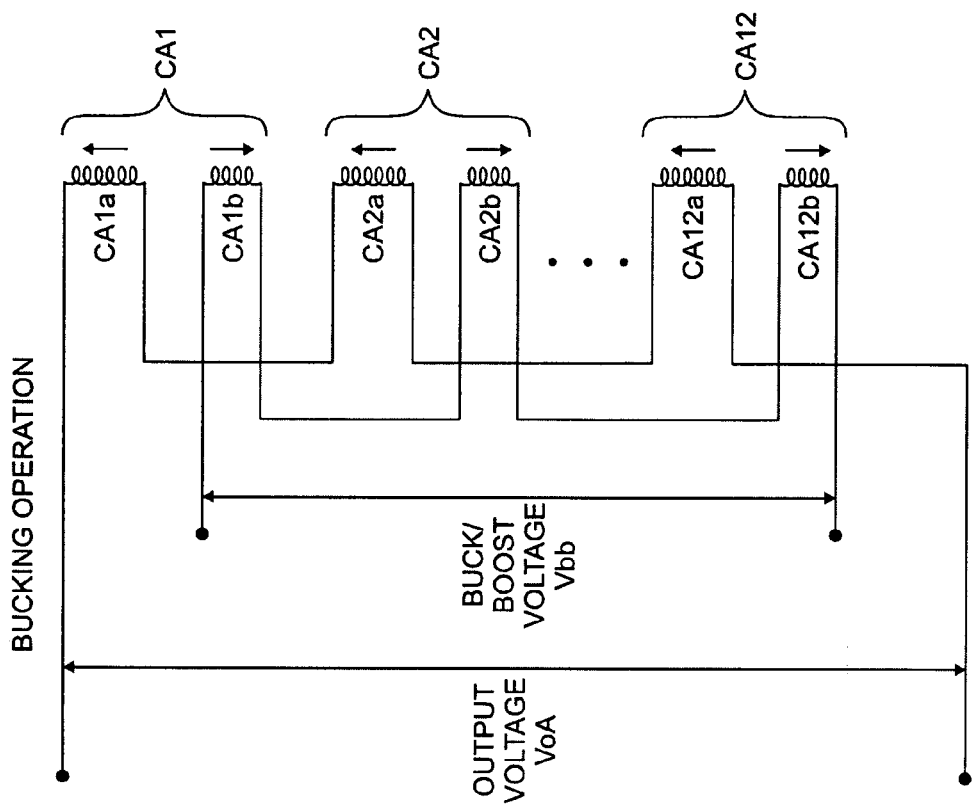
Figure 4B:
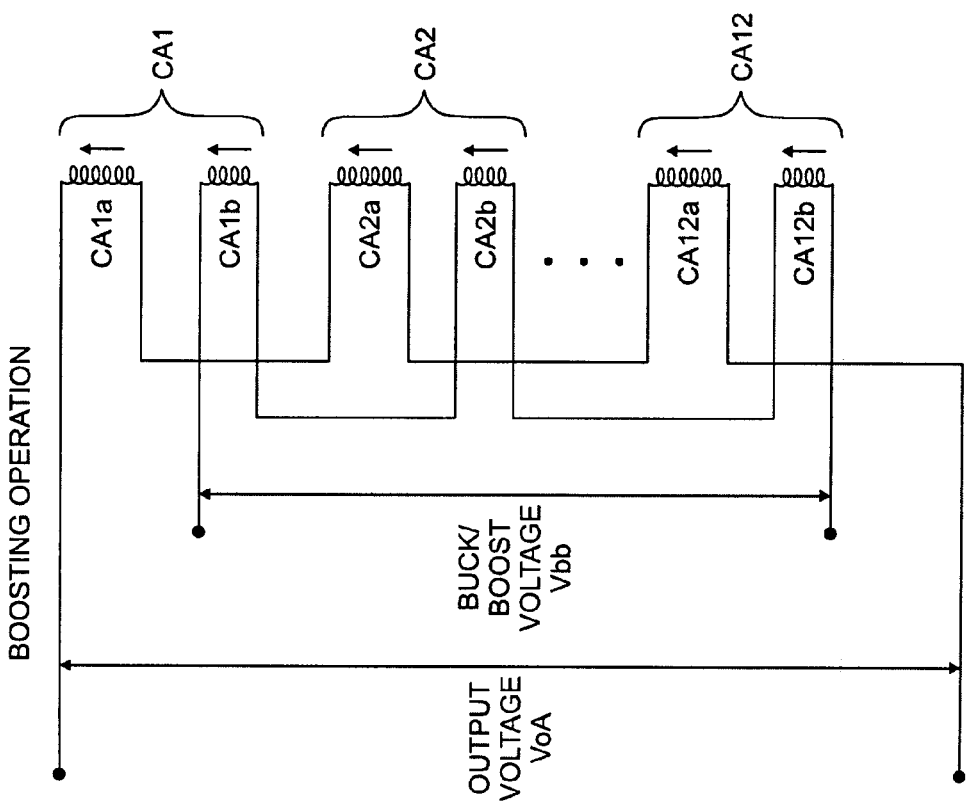

FIG. 4B shows an embodiment in which switches SW are again connected in the first position, resulting in first sub-coils CA1a-CA12a being connected in series, and second sub-coils CA1b-CA12b being connected in series with buck/boost voltage Vbb. However, in FIG. 4B buck/boost voltage Vbb is applied to second sub-coils CA1b-CA12b to create a boosting effect on output voltage VoB. The buck/boost voltage Vbb is applied in phase with output voltage VoA, such that magnetic flux generated in second sub-coils CA1b-CA12b is in the same direction as magnetic flux generated by rotor 24 (shown in FIG. 2).

As rotor 24 spins along with magnetic poles P1-P24, magnetic flux seen by coils CA1-CA12 changes direction, resulting in the generation of alternating current power. In order for buck/boost voltage Vbb to consistently increase the magnetic flux in sub-coils CA1a-CA12a, buck/boost voltage Vbb must be maintained at the same frequency as output voltage VoA. Various ways of maintaining the proper frequency of buck/boost voltage Vbb were discussed above.

The additive nature of flux in first sub-coils CA1a-CA12a and second sub-coils CA1b-CA12b is shown by the arrows located adjacent each sub-coil in FIG. 4B. The magnetic flux generated in second sub-coils CA1b-CA12b increases the net amount of magnetic flux in first sub-coils CA1a-CA12a, and therefore increases output voltage VoA. It is important to note, that while first sub-coil CA1a and second sub-coil CA1b are shown as electrically separate elements in FIGS. 3-7, they are each sub-parts of coil CA1, which is wrapped around a single stator tooth. Therefore, first sub-coil CA1a and second sub-coil CA1b are coupled together by the stator tooth coil CA1 is wrapped around. Magnetic flux generated in second sub-coils CA1b-CA12b influences the amount of flux in first sub-coils CA1a-CA12a. As shown in Equation 1 above, increasing the magnetic flux seen by first sub-coil CA1a results in an increase in voltage generated by first sub-coil CA1a. Therefore, the output voltage created by the switch configuration and buck/boost voltage Vbb shown in FIG. 4B results in an increase in output voltage VoA with respect to the output voltage generated with respect to FIG. 4A. The number of coils responsible for producing output voltage VoA is the same in FIGS. 4A and 4B, however, additional magnetic flux is generated in first sub-coils CA1a-CA12a in the embodiment shown in FIG. 4B, resulting in greater output voltage VoA. Output voltages VoB and VoC generated by other coils (not shown) would be the same.

FIG. 4C illustrates the effect of connecting switches SW in the first position and applying a bucking voltage to second sub-coils CA1b-CA12b. The buck/boost voltage Vbb is applied such that magnetic flux generated in second sub-coils CA1b-CA12b is in the opposite direction as the magnetic flux generated by rotor 24 (shown in FIG. 2) and seen by first sub-coils CA1a-CA12a. Again, this requires buck/boost voltage Vbb be maintained at the same frequency as output voltage Vo. However, in order for buck/boost voltage Vbb to decrease the magnetic flux seen in first sub-coils CA1a-CA12a, the phase of buck/boost voltage Vbb is set to be 180° out of phase (i.e., inverted) with output voltage VoA. In one embodiment, the phase of buck/boost voltage Vbb is modified by switching the leads connecting buck/boost voltage Vbb to second sub-coils CA1b-CA12b. The directional arrows adjacent to first and second sub-coils illustrate how magnetic flux generated in second sub-coils CA1b-CA12b opposes magnetic flux seen in first sub-coils CA1a-CA12a. The magnetic flux generated in second sub-coils CA1b-CA12b decreases the amount of magnetic flux in first sub-coils CA1a-CA12a, and therefore decreases output voltage VoA. As discussed above, magnetic flux generated in second sub-coil CA1b is transmitted along the stator tooth to influence first sub-coil CA1a. By decreasing the magnetic flux in first sub-coils CA1a-CA12a using buck/boost voltage Vbb to create opposing magnetic flux in second sub-coil CA1b-CA12b, output voltage VoA is decreased. As shown in Equation 1 above, decreasing the magnetic flux seen by first sub-coil CA1a results in a decrease in voltage generated by first sub-coil CA1a. Therefore, output voltage VoA is decreased with respect to the output voltage generated with respect to FIG. 4A. The number of coils responsible for producing output voltage VoA is the same in FIGS. 4A-4C, however, less magnetic flux is generated in first sub-coils CA1a-CA12a in the embodiment shown in FIG. 4C, resulting in a decrease in output voltage VoA.

Although the present invention can be used to maintain a constant output voltage Vo, the mechanics of how this is done are more easily understood if we assume the impedance of load 16 and the rotational velocity of prime mover 12 remain constant while the effect of different configurations on output voltage Vo are explored. By way of example, assume coils CA1-CA12 (without taking into account the configuration of the sub-coils) are capable of generating 100 volts (rms) at output voltage Vo at the current frequency of prime mover 12 and impedance of load 16. Further, assume first sub-coils CA1a-CA12a account for 80% of the windings making up coils CA1-CA12 (first sub-coil to coil turn ratio of 0.8:1). With these assumptions, if first sub-coils CA1a-CA12a and second sub-coils CA1b-CA12b are connected in the first configuration and no buck/boost voltage Vbb is applied as shown in FIG. 4A, then first sub-coils CA1a-CA12a will generate 80 volts (rms) at output voltage VoA. If buck/boost voltage Vbb is applied to second sub-coils CA1b-CA12b as shown in FIG. 4B, causing an increase in magnetic flux seen by first sub-coil CA1a-CA12a, then 100 volts will be generated at output voltage VoA. Likewise, if buck/boost voltage Vbb is applied to second sub-coils CA1b-CA12b as shown in FIG. 4C, causing a net decrease in magnetic flux seen by first sub-coil CA1a-CA12a, then 60 volts will be generated at output voltage VoA.

Figure 5:
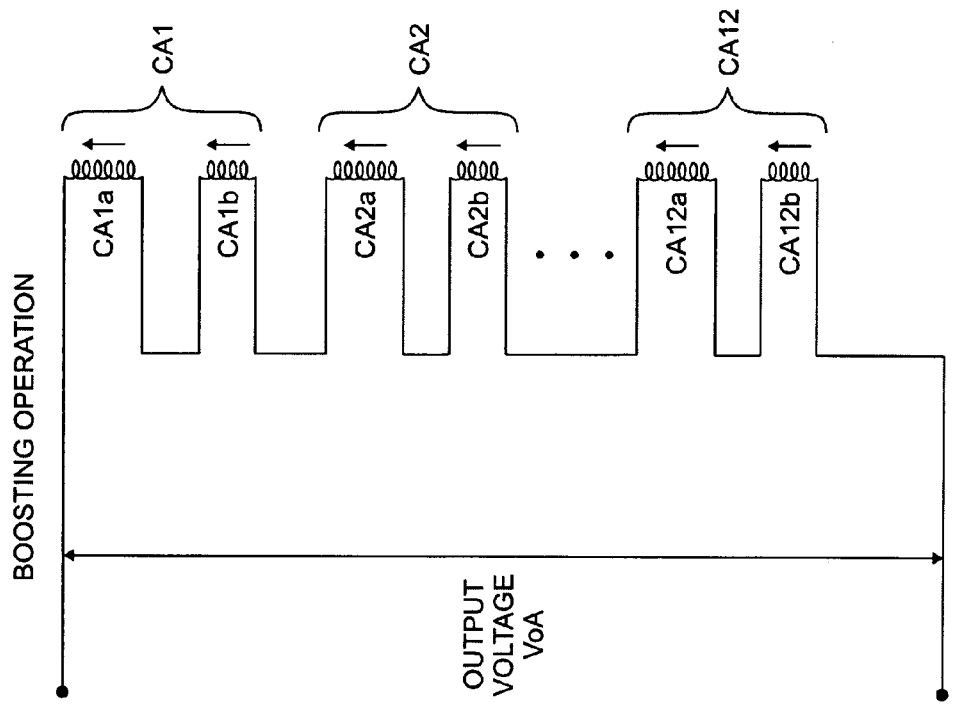
FIG. 5 is a circuit diagram illustrating stator coils of the PMG connected in a second configuration, in which the first sub-coils are connected in series with the second sub-coils.

FIG. 5 shows an embodiment in which switches SW1-SW36 are connected in a second configuration (each switch is moved to the position labeled "2"), resulting in first sub-coils CA1a-CA12a and second sub-coils CA1b-CA12b being connected together in series. That is, first sub-coil CA1a is connected in series with second sub-coil CA1b via switches SW1 and SW2. Second sub-coil CA1b is connected in series with the next first sub-coil CA2a via SW3. Buck/boost voltage Vbb is not connected to anything in this configuration. Because each of the sub-coils is connected in series, this configuration operates essentially just as coils CA1-CA12. That is, first sub-coil CA1a and second sub-coil CA1b operate as coil CA1. Similarly, first sub-coil CA2a and second sub-coil CA2b operate as coil CA2.

Figure 6:
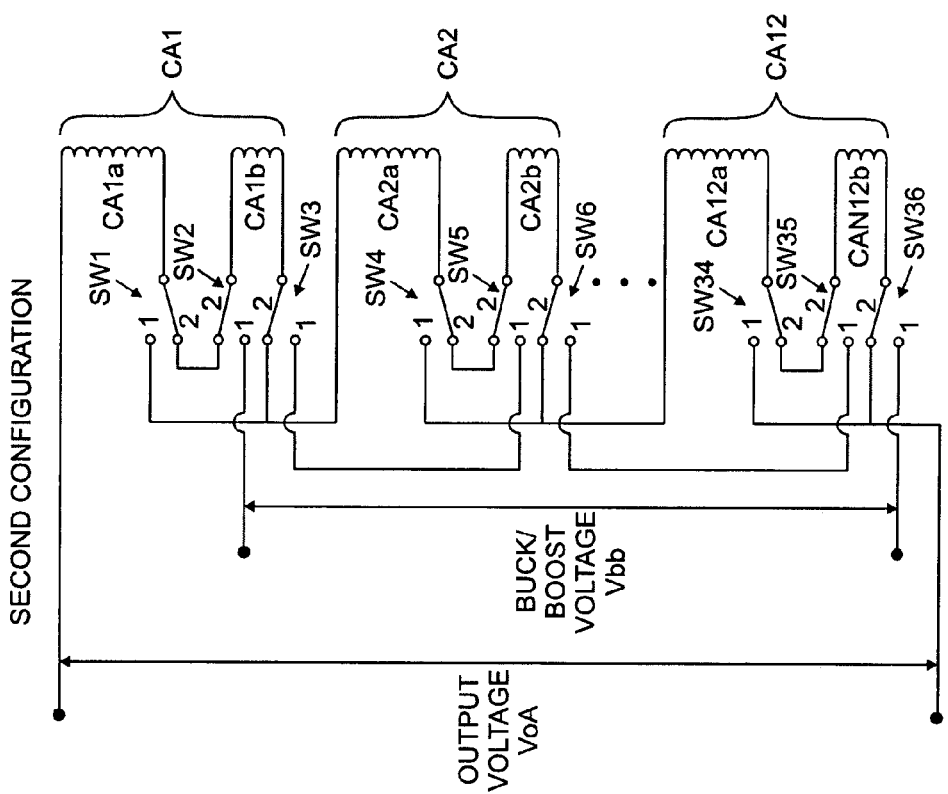
FIG. 6 is a circuit diagram illustrating the effect of connecting the first and second sub-coils of the PMG in the second configuration.

FIG. 6 shows the effect of connecting first sub-coils CA1a-CA12a and CA1b-CA12b in series. In this configuration, although no magnetic flux is being created by buck/boost voltage Vbb in the number of second sub-coils CA1b-CA12b, the output voltage VoA generated by PMG 14 is increased because of the additional number of coil turns added. Recall Equation 1 stated that output voltage Vo is directly related to number of turns, as the number of turns increases, so does output voltage VoA. In the embodiment shown in FIG. 6, second sub-coils CA1b-CA12b are connected in series with first sub-coils CA1a-CA12a, increasing the number of coil turns used to generate output voltage VoA. Increasing the number of coil turns results in an increase in output voltage VoA.

Using the numerical example provided above, assuming coils CA1-CA12 are capable of generating 100 volts (rms) at the current frequency of prime mover 12 and current impedance of load 16. By connecting first sub-coils CA1a-CA12a in series with CA1b-CA12b, the number of windings being used to generate output voltage VoA is equal to the number of windings making up coils CA1-CA12, resulting in 100 volts (rms) being generated at output voltage VoA.

As shown in FIGS. 3-6, output voltage Vo can be altered or maintained by adjusting the magnetic flux flowing through the sub-coils responsible for generating output voltage Vo, or by adjusting the number of windings used to generate output voltage Vo. However, as shown in FIGS. 3-6, dividing coils into two sub-coils allows limited flexibility in adjusting output voltage Vo. By increasing the number of sub-coils within each coil CA1-CA12, the more finely output voltage VoA can be tuned.

Figure 7:
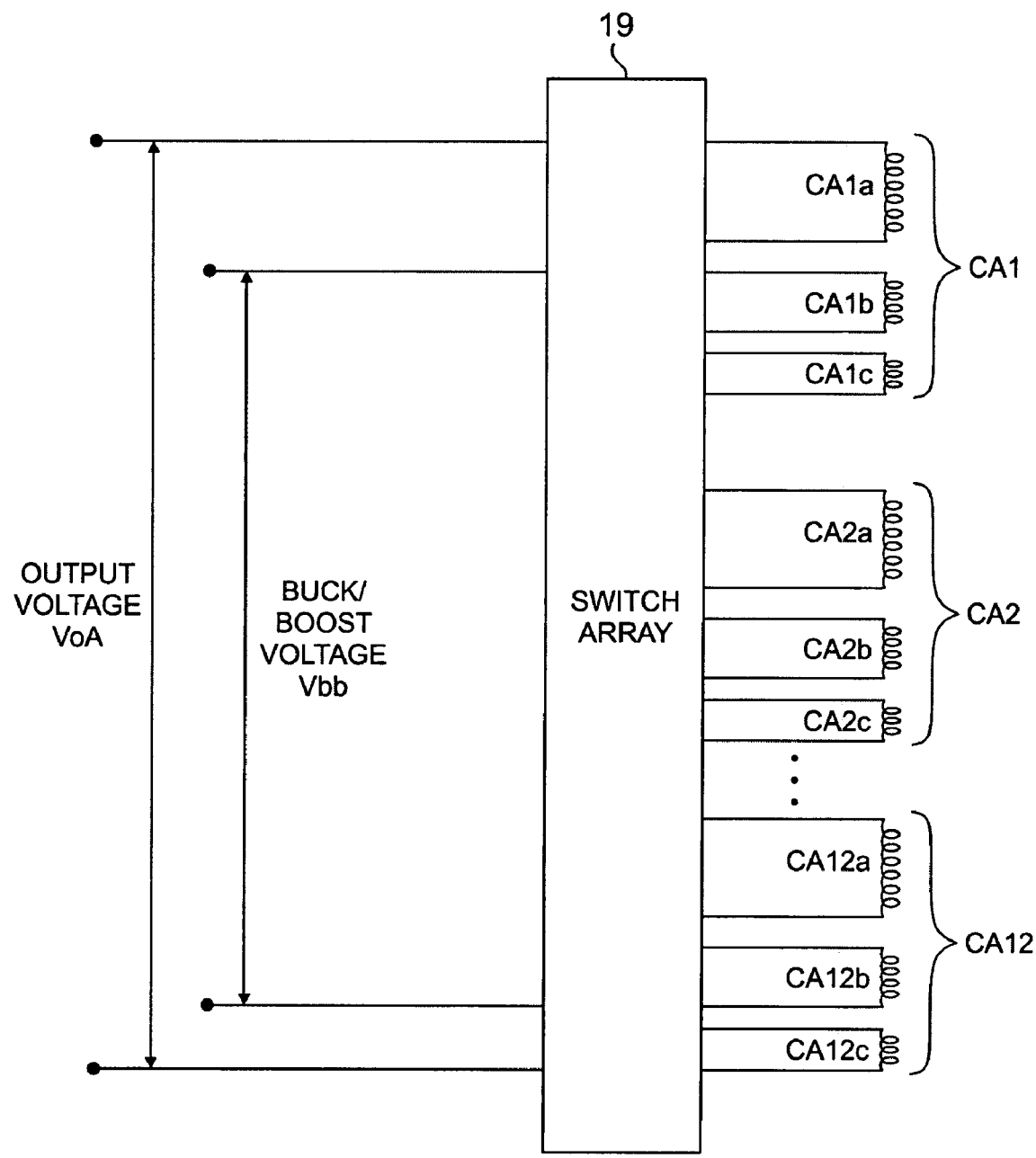
FIG. 7 is a circuit diagram illustrating stator coils of the PMG divided into three sub-coils.

For instance, FIG. 7 shows coils CA1-CA12 divided into three sub-coils, first sub-coils CA1a-CA12a, second sub-coils CA1b-CA12b, and third sub-coils CA1c-CA12c. For the sake of simplicity, sub-coils are shown connected to switching array 19 rather than to individual switches. Buck/boost voltage Vbb is applied to selected sub-coils through switch array 19 as well. This allows buck/boost voltage Vbb to be applied to more than one set of sub-coils. For the sake of simplicity, we again assume that each coil CA1-CA12 is composed of 100 turns. For example then, first sub-coil CA1a-CA12a is composed of 60 turns, and second sub-coil CA1b-CA12b is composed of 30 turns, and third sub-coil CA1c-CA12c is composed of the remaining 10 turns.

The mechanics regarding bucking or boosting voltage by application of buck/boost voltage Vbb as well as bucking or boosting voltage by adding or subtracting the number of sub-coils (and thus number of turns) used to generate output voltage Vo remain the same as in the examples discussed above. The difference lies in the increased number of configurations possible, resulting in an increase in tuning capability of output voltage Vo.

For instance, if only first sub-coils CA1a-CA12a are connected in series, and no buck/boost voltage Vbb is applied, then in our numerical example first sub-coils CA1a-CA12a would generate 60 volts (rms) at output voltage VoA. By selectively connecting either second sub-coils CA1b-CA12b or third sub-coils CA1c-CA12c and applying buck/boost voltages Vbb, output voltage VoA can be tightly controlled. As shown in FIG. 7, because buck/boost voltage Vbb is applied to different sub-coils depending on the situation, buck/boost voltage Vbb is connected to switches within switch array 19, allowing controller 18 to select the sub-coils to which buck/boost voltage Vbb is applied to in addition to controlling the phase in which buck/boost voltage Vbb is applied. A number of examples are provided in Table 1 below that illustrate how connecting the sub-coils in different configurations affects output voltage VoA, although in operation, the present invention can connect the sub-coils in different configurations to maintain an essentially constant output voltage VoA despite speed and load changes.

TABLE 1

| Desired Output Voltage VoA | Configuration of Sub-Coils | Buck/Boost Voltage |
| --- | --- | --- |
| 20 volts (rms) | 1st sub-coils connected alone in series. 2nd and 3rd sub-coils connected in series with one another | Bucking voltage applied to series connection of 2nd and 3rd sub-coils. |
| 30 volts (rms) | 1st sub coils connected alone in series 2nd sub-coils connected alone in series 3rd sub-coils not used. | Bucking voltage applied to 2nd sub-coils. |
| 40 volts (rms) | 1st and 3rd sub-coils connected in series with one another. 2nd sub-coils connected alone in series | Bucking voltage applied to 2nd sub-coils. |
| 50 volts (rms) | 1st sub coils connected alone in series. 3rd sub-coils connected | Bucking voltage applied to 3rd sub-coils. |

TABLE 1-continued

| Desired Output Voltage VoA | Configuration of Sub-Coils | Buck/Boost Voltage |
|---|---|---|
| | alone in series. 2nd sub-coils not used. | |
| 60 volts (rms) | 1st sub coils connected alone in series. 2nd and 3rd sub-coils not used. | No buck/boost voltage applied. |
| 70 volts (rms) | 1st and 3rd sub-coils connected in series with one another. 2nd sub-coils not used. | No buck/boost voltage applied. |
| 80 volts (rms) | 1st and 2nd sub-coils connected in series with one another. 3rd sub-coils connected alone in series. | Bucking voltage applied to 3rd sub-coils. |
| 90 volts (rms) | 1st and 2nd sub-coils connected in series with one another. 3rd sub-coils not used. | No buck/boost voltage applied. |
| 100 volts (rms) | 1st, 2nd and 3rd sub-coils connected in series with one another. | No buck/boost voltage applied. |

As seen from this example, dividing coil CA1-CA12 into three coils provides greater flexibility in controlling output voltage VoA and therefore in maintaining an essentially constant output voltage VoA (and likewise, in output voltage VoB and VoC).

A voltage regulation system and method has been described in which stator coils are sub-divided into at least two sub-coils. In other embodiments, stator coils may be sub-divided into more than two sub-coils, allowing for a greater number of configuration options. The method of regulation employs a controller which selectively controls a number of switches to connect the number of sub-coils in different configurations (allowing the number of turns used to generated output voltage to be varied), as well as selectively applying buck/boost voltage to increase or decrease the magnetic flux seen by the set of coils responsible for generating the output voltage. A controller is responsible for configuring the sub-coils as well as applying an appropriate buck/boost voltage such that output voltage from the PMG is regulated to a desired value. For instance, if output voltage begins increasing due to an increase in the speed of the prime mover or decrease in the impedance of a load connected to the PMG, the controller configures the number of sub-coils and the buck/boost voltage to decrease the output voltage of PMG. In other embodiments, it may be desirable to selectively increase or decrease the output voltage of the PMG, rather than maintain a constant voltage level.

The invention claimed is:

1. A permanent magnet generator (PMG) system for regulating an output voltage, the system comprising:
   a permanent magnet generator (PMG), comprising:
      a rotor;
      a stator having stator teeth; and
      stator coils wrapped around the stator teeth and divided into sub-coils, wherein a first set of sub-coils is connected in series to generate the output voltage;
   a buck/boost voltage source for producing a buck/boost voltage; and
   a controller connected to monitor the output voltage and to apply the buck/boost voltage to selected sub-coils not connected to the first set of sub-coils based on the monitored output voltage.

2. The system of claim 1, wherein the controller causes the buck/boost voltage to be applied in phase with the output voltage to increase the output voltage.

3. The system of claim 1, wherein the controller causes the buck/boost voltage to be applied 180 degrees out of phase with the output voltage to decrease the output voltage.

4. The system of claim 1, including:
   switches connected to the sub-coils and controlled by the controller to allow the sub-coils to be connected in a plurality of different configurations to control the output voltage.

5. The system of claim 1, wherein the sub-coils within each of the stator coils include a number of turns, each sub-coil within one of the stator coils having a different number of turns.

6. The system of claim 1, wherein the buck/boost voltage source generates the buck/boost voltage at a frequency equal to a frequency of the output voltage.

7. A permanent magnet generator system, the system comprising:
   a permanent magnet generator that includes a number of stator coils divided into sub-coils, wherein selected sub-coils are connected to generate an output voltage; and
   a controller connected to monitor the output voltage generated by the PMG and to apply a buck/boost voltage to sub-coils that are not connected to generate the output voltage to either increase or decrease the output voltage based on the monitored output voltage.

8. The system of claim 7, wherein the controller applies a buck/boost voltage in phase with the monitored output voltage if the monitored output voltage is below a desired level.

9. The system of claim 7, wherein the controller applies a buck/boost voltage 180 degrees out of phase with the monitored output voltage if the monitored output voltage is above a desired level.

10. The system of claim 7, further including:
    a plurality of switches within a switch array that are controlled by the controller to selectively connect the sub-coils together in one of a plurality of configurations based on the monitored output voltage.

11. The system of claim 10, wherein the controller controls the plurality of switches to connect selected sub-coils in series with the sub-coils connected to generate the output voltage.

12. The system of claim 10, wherein the controller applies a buck/boost voltage, to selected sub-coils that are not connected to generate the output voltage within a particular configuration to either increase or decrease the output voltage.

* * * * *

UNITED STATES PATENT AND TRADEMARK OFFICE
CERTIFICATE OF CORRECTION

PATENT NO. : 7,408,327 B2 Page 1 of 1
APPLICATION NO. : 11/788953
DATED : August 5, 2008
INVENTOR(S) : Mahesh J. Shah et al.

It is certified that error appears in the above-identified patent and that said Letters Patent is hereby corrected as shown below:

Column 4, Line 32, delete "CA1-CA1 2", insert --CA1-CA12--

Signed and Sealed this

Twelfth Day of May, 2009

JOHN DOLL
*Acting Director of the United States Patent and Trademark Office*